United States Patent
Han et al.

(10) Patent No.: US 11,467,062 B2
(45) Date of Patent: Oct. 11, 2022

(54) OIL PRESSURE SWITCH, APPARATUS FOR DIAGNOSING PISTON COOLING OIL JET, AND METHOD OF CONTROLLING THE SAME

(71) Applicants: HYUNDAI MOTOR COMPANY, Seoul (KR); KIA CORPORATION, Seoul (KR)

(72) Inventors: Sang Bong Han, Hwaseong-si (KR); Choo Saeng Choi, Seongnam-si (KR); Sang Suk Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/227,836

(22) Filed: Apr. 12, 2021

(65) Prior Publication Data

US 2021/0231529 A1    Jul. 29, 2021

Related U.S. Application Data

(62) Division of application No. 16/171,143, filed on Oct. 25, 2018, now Pat. No. 11,009,426.

(30) Foreign Application Priority Data

Dec. 19, 2017    (KR) .......................... 10-2017-0175196

(51) Int. Cl.
*G01M 15/09*    (2006.01)
*F01P 3/08*    (2006.01)
(Continued)

(52) U.S. Cl.
CPC .............. *G01M 15/09* (2013.01); *F01P 3/08* (2013.01); *F01P 7/14* (2013.01); *F01P 11/18* (2013.01);
(Continued)

(58) Field of Classification Search
CPC ......... G01M 15/09; G07C 5/0808; F01P 3/08; F01P 7/14; F01P 11/18; F01P 2007/146; F01P 2025/04
See application file for complete search history.

(56) References Cited

U.S. PATENT DOCUMENTS

| 2,537,354 A | 1/1951 | Korte et al. |
| 2,698,887 A | 1/1955 | Shaw |

(Continued)

FOREIGN PATENT DOCUMENTS

| CN | 2876342 Y | 3/2007 |
| CN | 106089351 A | 11/2016 |

(Continued)

OTHER PUBLICATIONS

Office Action issued in corresponding Chinese Patent Application No. 201811334037.2 dated Jul. 21, 2021, with English translation.

(Continued)

*Primary Examiner* — Eric S. McCall
(74) *Attorney, Agent, or Firm* — Morgan, Lewis & Bockius LLP

(57) ABSTRACT

An oil pressure switch, which is connected in an oil path of a piston oil cooling jet to diagnose oil pressure, includes an upper body and a lower body, in which a plunger vertically moves according to oil pressure; a fixing plate that is disposed between the upper body and the lower body; a moving plate that selectively contacts a fixing plate according to movement of the plunger; a spring that generates an elastic force in a direction in which the moving plate selectively contacts the fixing plate; an output terminal that outputs an output signal according to contact between the moving plate and the fixing plate; and a parallel resistor that is electrically connected with the output terminal and electrically connected with a control resistor of a controller.

19 Claims, 7 Drawing Sheets

(51) Int. Cl.
*F01P 11/18* (2006.01)
*G07C 5/08* (2006.01)
*F01P 7/14* (2006.01)

(52) U.S. Cl.
CPC ...... *G07C 5/0808* (2013.01); *F01P 2007/146* (2013.01); *F01P 2025/04* (2013.01)

(56) References Cited

U.S. PATENT DOCUMENTS

| | | | |
|---|---|---|---|
| 3,056,298 | A | 10/1962 | Scholz |
| 3,661,179 | A | 5/1972 | Hasumi |
| 4,038,506 | A | 7/1977 | Filip |
| 5,860,448 | A | 1/1999 | Lee et al. |
| 7,199,686 | B1 | 4/2007 | Tsai |
| 10,711,682 | B2 * | 7/2020 | Kim .................. F02D 41/22 |
| 2012/0103442 | A1 | 5/2012 | Min et al. |
| 2012/0103447 | A1 | 5/2012 | Min et al. |
| 2012/0291536 | A1 * | 11/2012 | Okazawa ................ F01M 1/16 73/114.57 |
| 2012/0296518 | A1 * | 11/2012 | Bruno ..................... F01P 3/08 701/34.4 |
| 2013/0136623 | A1 | 5/2013 | Hwang et al. |
| 2013/0192545 | A1 * | 8/2013 | Bidner ................ F01M 11/10 123/196 R |
| 2015/0240841 | A1 | 8/2015 | Lemmers, Jr. et al. |
| 2015/0377115 | A1 * | 12/2015 | Shinagawa ............. F01P 3/08 123/41.15 |
| 2016/0146330 | A1 | 5/2016 | Kim et al. |
| 2016/0363040 | A1 | 12/2016 | Kim |
| 2017/0342891 | A1 | 11/2017 | Ha |
| 2018/0058277 | A1 * | 3/2018 | Demots .................. F01M 1/16 |
| 2019/0078493 | A1 * | 3/2019 | Kim ....................... F02F 3/16 |
| 2021/0033019 | A1 * | 2/2021 | Patil .................... F01M 11/02 |
| 2021/0108553 | A1 * | 4/2021 | Lee ........................ F01P 3/10 |
| 2022/0018269 | A1 * | 1/2022 | Gens ..................... F01M 1/20 |

FOREIGN PATENT DOCUMENTS

| | | |
|---|---|---|
| JP | 01097060 U | 6/1989 |
| JP | H07-182956 A | 7/1995 |
| JP | 2005155799 A | 6/2005 |
| KR | 1020040015581 A | 2/2004 |
| KR | 10-2013-0004957 A | 1/2013 |
| KR | 101470235 B1 | 12/2014 |
| KR | 10-1734771 B1 | 5/2017 |
| KR | 10-2017-0072413 A | 6/2017 |
| KR | 1020170069017 A | 6/2017 |

OTHER PUBLICATIONS

Office Action issued in corresponding U.S. Appl. No. 16/171,143 dated Sep. 23, 2020.
Notice of Allowance issued in corresponding U.S. Appl. No. 16/171,143 dated Jan. 25, 2021.
Office Action issued in corresponding Korean Patent Application No. 10-2017-0175196 dated Jan. 18, 2022, with English translation.
Notice of Allowance dated May 16, 2022, issued in corresponding Korean Patent Application 10-2017-0175196.

* cited by examiner

Fig. 7

| Solenoid control signal | | Input voltage of control input end | Note |
|---|---|---|---|
| N/A | | 5~4.8 | Control input end disconnected |
| | | 0~0.2 | Control input end and ground end disconnected |
| CLOSE signal | | 4±a | Normal |
| | | 0.8~1.2 | Solenoid valve in opened state is fixed to the opened state |
| OPEN signal | | 1±a | Normal |
| | | 3.8~4.2 | Solenoid valve in closed state is fixed to the closed state |

OIL PRESSURE SWITCH, APPARATUS FOR DIAGNOSING PISTON COOLING OIL JET, AND METHOD OF CONTROLLING THE SAME

CROSS-REFERENCE TO RELATED APPLICATION

This application is the Divisional Application of U.S. patent application Ser. No. 16/171,143 filed on Oct. 25, 2018, which claims priority to and the benefit of Korean Patent Application No. 10-2017-0175196 filed in the Korean Intellectual Property Office on Dec. 19, 2017, the entire contents of which are incorporated herein by reference.

TECHNICAL FIELD

The present disclosure relates to an oil pressure switch, and a method and apparatus for diagnosing a piston cooling oil jet using the same.

BACKGROUND

In general, a piston cooling oil jet (PCJ) for a vehicle decreases a temperature of a piston exposed to a high-temperature and high-pressure condition by spraying oil to the piston to thereby maintain heat resistance and durability of the piston.

Thus, the piston cooling oil jet is provided in a cylinder block, and an oil path through which engine oil circulates is formed between the oil jet and a main oil gallery. A hydraulic pump that forces the engine oil and a solenoid valve that opens and closes the oil path are provided in the oil path. When the solenoid valve is opened, the engine oil pumped by the hydraulic pump flows along the oil path, and the oil jet sprays the engine oil to the piston by oil pressure introduced to the piston cooling oil jet. In this case, oil sprayed to the piston is drained to an oil pan and thus recirculated. An oil pressure switch is provided in the oil path to measure a pressure of the engine oil. The oil pressure switch measures oil pressure in the oil path. In order to diagnose the solenoid valve, a failure of the solenoid valve and/or the oil pressure switch is diagnosed from a signal detected by an additional oil pressure sensor.

Further, installation of on-board diagnostics (OBD) has become mandatory, and regulations have become strengthened. That is, according to OBD regulations, a part that diagnoses a failure in emission parts of a vehicle needs to be equipped with a diagnostic apparatus to diagnose a failure of the part.

However, according to a conventional art, an additional oil pressure sensor is required to diagnose a failure of the solenoid valve and the oil pressure switch in the piston cooling jet, and thus manufacturing cost of the vehicle is increased.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an oil pressure switch that diagnoses a piston cooling jet that includes a solenoid valve and an oil pressure switch of the piston cooling jet without using an additional oil pressure sensor, an apparatus using the oil pressure switch, and a method of controlling the apparatus.

An oil pressure switch, which is connected in an oil path of a piston oil cooling jet to diagnose oil pressure according to an exemplary embodiment of the present disclosure includes: an upper body and a lower body in which a plunger that vertically moves according to oil pressure; a fixing plate that is provided between the upper body and the lower body; a moving plate that selectively contacts a fixing plate according to movement of the plunger; a spring that generates an elastic force in a direction in which the moving plate contacts the fixing plate; an output terminal that outputs an output signal according to contact between the moving plate and the fixing plate; and a parallel resistor that is electrically connected with the output terminal and electrically connected with a control resistor of a controller.

According to another exemplary embodiment of the present disclosure, an apparatus for diagnosing a failure in a piston oil cooling jet having an oil path through which oil flows for cooling a piston includes: a solenoid valve that selectively opens and closes the oil path; an oil pressure switch that is connected in the oil path, outputs an output signal through a switch output terminal according to a pressure of oil that flows through the oil path, and to which a parallel resistor is electrically connected to a front end of the switch output terminal; and a controller that includes a control resistor of which a first end is electrically connected with control power and a second end is electrically connected with the switch output terminal of the oil pressure switch through a connector, controls opening and closing of the solenoid valve, and determines whether the solenoid valve and the oil pressure switch malfunction from an input voltage of a control input terminal of the controller.

When the input voltage of the control input terminal is included within a predetermined range from a first predetermined voltage, the controller may determine that the controller and the oil pressure switch are not electrically connected.

The first predetermined voltage may be set as an output voltage of the control power.

The input voltage of the control input terminal is included within a predetermined range from a second predetermined voltage, the controller may determine that the parallel resistor in the oil pressure switch is damaged.

The second predetermined voltage may be set as an output voltage of a ground terminal.

When a close signal that controls the solenoid valve to be closed is output from the controller and the input voltage of the control input terminal is included within a predetermined range from a third predetermined voltage, the controller may determine that the solenoid valve is opened and then fixed to the opened state.

The third predetermined voltage may be set as a voltage output from the control power and then applied to one of parallel resistors when one of the parallel resistors and the control resistor are connected in series.

When an open signal that controls the solenoid valve to be opened is output from the controller and the input voltage of the control input terminal is included within a fourth predetermined voltage, the controller may determine that the solenoid valve is closed and then fixed to the closed state.

The fourth predetermined voltage may be set as a voltage that is output from the control power and then applied to a combined resistor when the parallel resistor and the combined resistor are connected to the control resistor in series.

The respective resistors that form the parallel resistors and the control resistor may be different in resistance.

According to another exemplary embodiment, a method for diagnosing a failure in a piston cooling jet, which includes a solenoid valve that selectively opens and closes an oil path, an oil pressure switch that outputs an output signal through a switch output terminal according to opening and closing of the solenoid valve and outputs an output signal through a switch output terminal that is electrically connected with parallel resistors, and a controller that includes a control resistor of which a first end is electrically connected with control power and a second end is electrically connected with the switch output terminal of the oil pressure switch through a connector, includes: determining whether an input voltage of a control input terminal of the controller is within a predetermined range from a first predetermined voltage by the controller; determining whether the input voltage of the control input terminal is within a predetermined range from a second predetermined voltage by the controller; determining whether the input voltage of the control input terminal is within a predetermined range from a third predetermined voltage by the controller when a close signal is output to close the solenoid valve; determining whether the input voltage of the control input terminal is within a predetermined range from a fourth predetermined voltage by the controller when an open signal that controls the solenoid valve to be opened is output; and determining whether the solenoid valve and the oil pressure switch malfunction from the input voltage of the control input terminal.

When the input voltage of the control input terminal is within the predetermined range from the first predetermined voltage, the controller may determine that the controller and the oil pressure switch are disconnected.

The first predetermined voltage may be set as an output voltage of the control power.

When the input voltage of the control input terminal is within the predetermined range from the second predetermined voltage, the controller may determine that the parallel resistors in the oil pressure switch are damaged.

The second predetermined voltage may be set as an output voltage of a ground terminal.

When the input voltage of the control input terminal is within the predetermined range from the third predetermined voltage, the controller may determine that the solenoid valve is opened and then fixed to the opened state.

When one of the parallel resistors and the control resistor are connected in series, the third predetermined voltage may be set as a voltage that is output from the control power and then applied to one of the parallel resistors.

When the input voltage of the control input terminal is within the predetermined range from the fourth predetermined voltage, the controller may determine that the solenoid valve is closed and then fixed to the closed state.

When a combined resistor of the parallel resistors and the control resistor are connected in series, the fourth predetermined voltage may be set to a voltage output from the control power and then applied to the combined resistor.

The oil pressure switch and the apparatus and method for diagnosing a piston cooling oil jet using the oil pressure switch according to the exemplary embodiments of the present disclosure can diagnose a failure in the oil pressure switch and the solenoid valve without using an additional oil pressure sensor, and accordingly, manufacturing cost of a vehicle can be reduced.

BRIEF DESCRIPTION OF THE DRAWINGS

The drawings are illustrated simply for describing an exemplary embodiment of the present disclosure, and thus the scope of the present disclosure should not be construed to be limited to the accompanying drawings.

FIG. 7 is a table that shows failure determination according to an input voltage of a control input terminal according to an exemplary embodiment of the present disclosure.

DETAILED DESCRIPTION OF THE EMBODIMENTS

Figure 1:
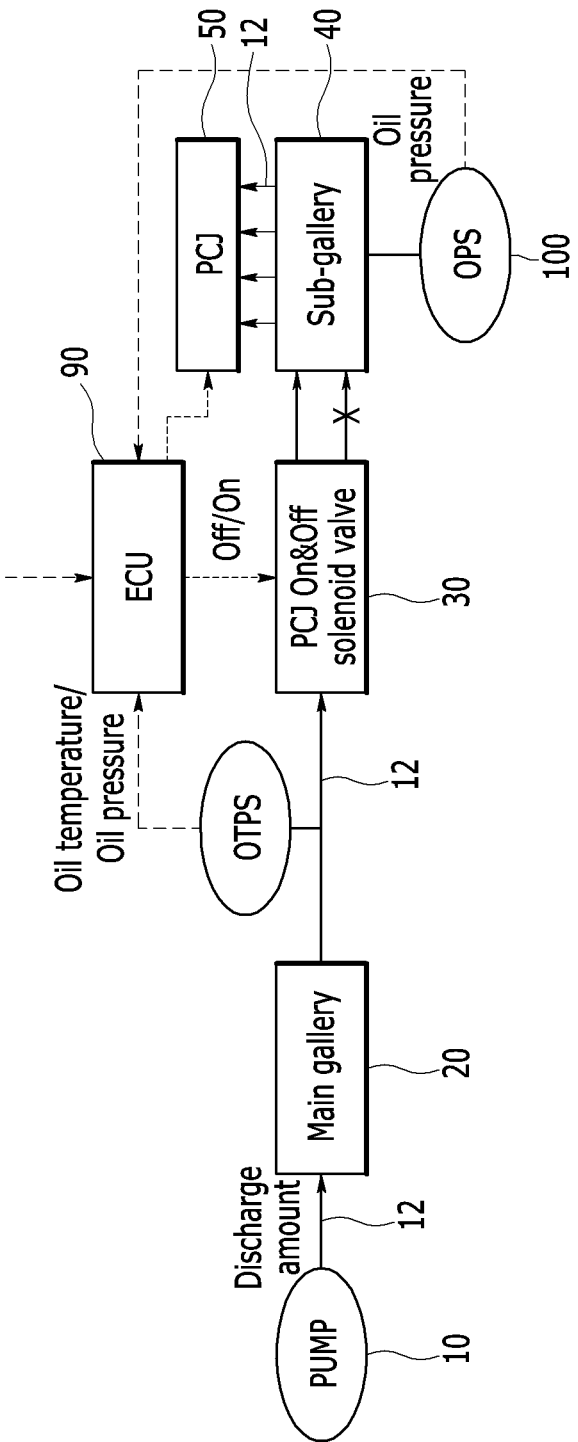
FIG. 1 is a block diagram of a diagnostic apparatus of a piston oil cooling jet according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Since the size and the thickness of each configuration shown in drawings are arbitrarily indicated for better understanding and ease of description, the present disclosure is not limited to the shown drawings, and the thickness of layers, films, panels, regions, etc., are exaggerated for clarity.

Hereinafter, an apparatus for diagnosing a failure in a piston oil cooling jet according to an exemplary embodiment of the present disclosure will be described with reference to the accompanying drawings.

FIG. 1 is a block diagram that shows a configuration of a piston oil cooling jet (PCJ) according to an exemplary embodiment of the present disclosure.

As shown in FIG. 1, the apparatus for diagnosing the piston oil cooling jet (hereinafter referred to as a PCJ diagnosis apparatus) according to an exemplary embodiment of the present disclosure includes: a hydraulic pump 10 that pumps oil through an engine through an oil path 12; a solenoid valve 30 that opens and closes the oil path 12; an oil pressure switch (OPS) 100 that is provided in the oil path 12; and a controller 90 that controls operation of the hydraulic pump 10 and the solenoid valve 30.

The hydraulic pump 10 takes in engine oil that is temporarily stored in the oil pan 12, and discharges the engine oil to a portion where lubrication is needed. The engine oil pumped by the hydraulic pump 10 is compressed to a high pressure in the hydraulic pump 10 and then discharged.

The engine oil discharged from the hydraulic pump 10 is supplied to the piston cooling jet 50 through a main gallery 20 and a sub-gallery 40 through the oil path 12, and high-pressure engine oil pumped by the hydraulic pump 10 is sprayed to the piston.

The hydraulic pump 10 and the main gallery 20 are connected through the main oil path 12, and the main gallery 20 and the sub-gallery 40 are connected through a sub-oil path 12. Hereinafter, for convenience of description, the main oil path 12 and the sub-oil path 12 will be referred to as the oil path 12.

The solenoid valve 30 is disposed between the oil paths 12 between the main gallery 20 and the sub gallery 40, and the solenoid valve 30 is opened and closed by the controller 90 depending on an engine load and/or an engine temperature.

The oil pressure switch 100 provided in the oil path 12 outputs an output signal according to an oil pressure of the engine oil flowing through the oil pressure switch 100.

The controller 90 outputs a control signal that controls operation of the hydraulic pump 10 and the solenoid valve 30, and determines a failure in the solenoid valve 30 and a failure in the oil pressure switch 100 from the output signal output from the oil pressure switch 100.

For this, the controller 90 may be provided as one or more processors operating by a predetermined program, and the predetermined program performs each stage of a failure diagnosis method of the piston oil cooling jet according to an exemplary embodiment of the present disclosure.

Hereinafter, the configuration of the oil pressure switch will be described in detail with reference to the accompanying drawings.

Figure 2:
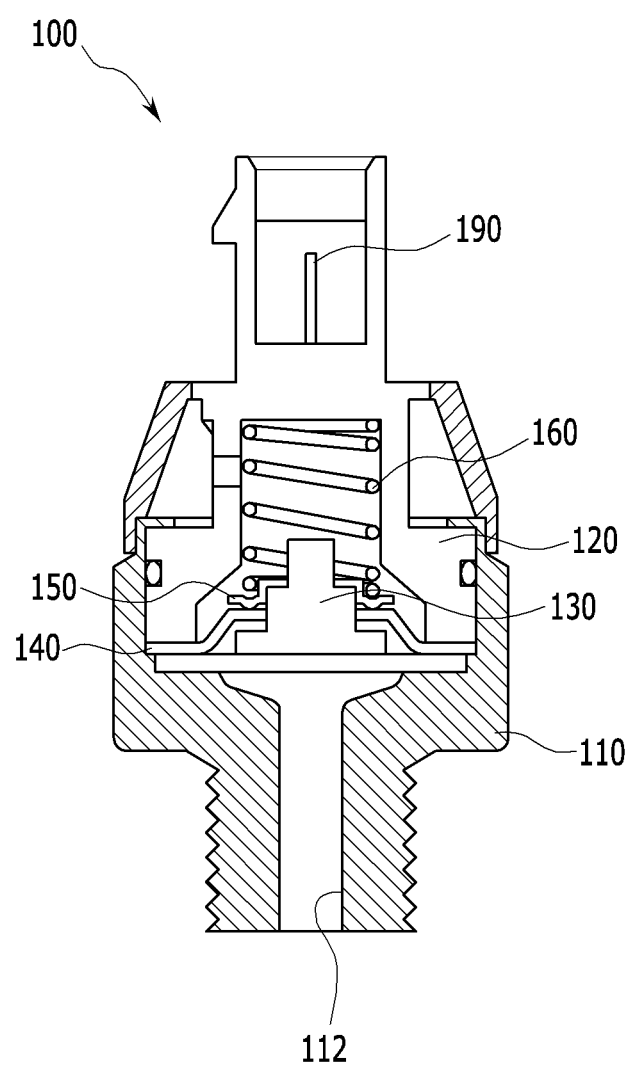
FIG. 2 shows a configuration of an oil pressure switch according to an exemplary embodiment of the present disclosure.
Figure 3:
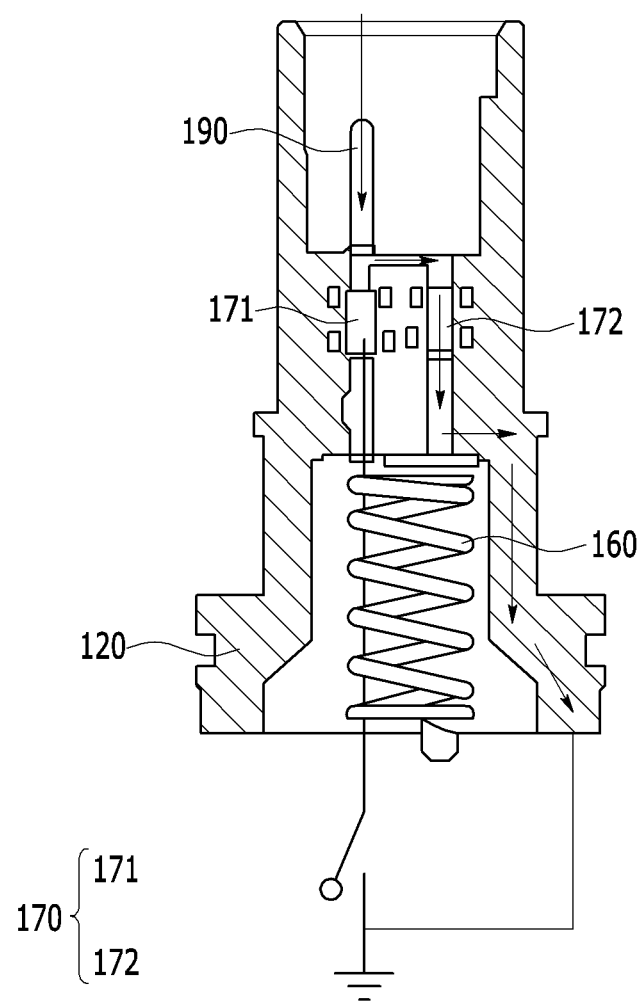
FIG. 3 and FIG. 4 show parallel resistors of the oil pressure switch according to an exemplary embodiment of the present disclosure.
Figure 4:
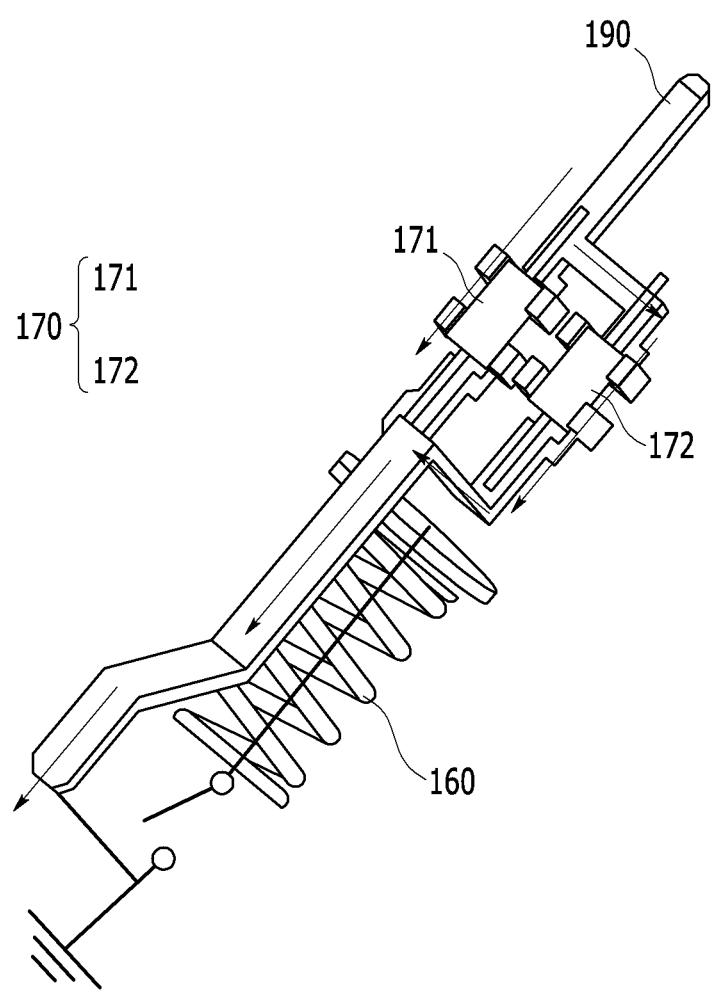
Figure 5:
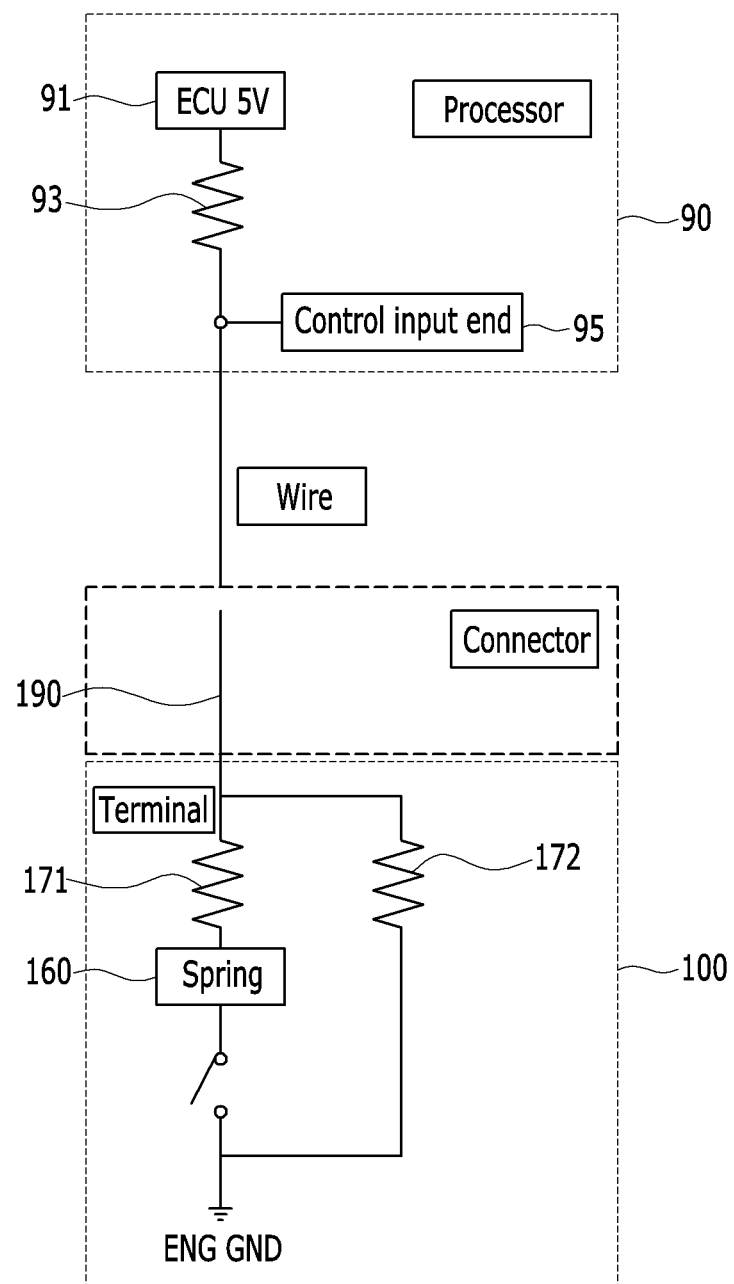
FIG. 5 is a circuit diagram of a relationship between the oil pressure switch and a controller according to an exemplary embodiment of the present disclosure.

FIG. 2 shows the configuration of the oil pressure switch according to an exemplary embodiment of the present disclosure. FIG. 3 and FIG. 4 show parallel resistors of the oil pressure switch according to an exemplary embodiment of the present disclosure.

Referring to FIG. 2 to FIG. 4, the oil pressure switch 100 forms an internal space by combining an upper body 120 and a lower body 110. The upper body 120 and the lower body 110 may be integrally formed. The upper body 120 and the lower body 110 are combined with a cylinder block (not shown), and the upper body 120 and the lower body 110 combined with the cylinder block serve as a ground terminal.

A center path 112 that fluidly communicates with the oil path 12 is formed in the lower body 110.

A plunger 130, which vertically moves according to a pressure of the engine oil supplied through the center path 112, is provided between the lower body 110 and the upper body 120. The plunger 130 vertically moves through a fixing plate 140 provided between the upper body 120 and the lower body 110.

A moving plate 150 is provided above the fixing plate 140, and the moving plate 150 vertically moves according to movement of the plunger 130. Springs 160 that provide elastic force in a direction in which the moving plate 150 contacts the fixing plate 140 are provided above the moving plate 150. When pressure of the engine oil is not supplied through the center path 112, the moving plate 150 contacts the fixing plate 140 by the springs 160. When the pressure of the engine oil is supplied through the center path 112, the plunger 130 moves upward such that the moving plate 150 is separated from the fixing plate 140.

Parallel resistors 170 are provided in the upper body 120, and the parallel resistors 170 are electrically connected with a switch output terminal 190 provided in the upper body 120. The switch output terminal 190 is electrically connected with the controller 90 through a connector.

The parallel resistors 170 include a first resistor 171 and a second resistor 172. A first end of the first resistor 171 is electrically connected with the switch output terminal 190 and a second end thereof is electrically connected with the moving plate 150 through the spring 160, and a first end of the second resistor 172 is electrically connected with the switch output terminal 190 and a second end thereof is electrically connected with the upper body 120.

As shown in FIG. 3, when the moving plate 150 and the fixing plate 140 contact, the first resistor 171 is electrically connected with the upper body 120 through the moving plate 150 and the fixing plate 140. Thus, the switch output terminal 190 is electrically connected in parallel with the first resistor 171 and the second resistor 172.

When the moving plate 150 is separated from the fixing plate 140, the first resistor 171 is not electrically connected with the upper body 120, and thus, the second end of the first resistor 171 is disconnected. Accordingly, the switch output terminal 190 is electrically connected in series with the second resistor 172.

That is, the moving plate 150 and the fixing plate 140 selectively contact according to movement of the moving plate 150, and thus the moving plate 150 and the fixing plate 140 serve as a switch.

The controller 90 that is electrically connected with the switch output terminal 190 of the oil pressure switch 100 includes a control resistor 93 that is connected with a control power 91, and a control input terminal 95 is provided at an end of the control resistor 93.

The control input terminal 95 and the switch output terminal 190 are electrically connected through the connector, and thus a failure of the solenoid valve 30 and/or the oil pressure switch 100 is determined from the output signal of the oil pressure switch 100 input through the switch output terminal 190.

The first resistor 171 and the second resistor 172, which form the parallel resistors 170 of the oil pressure switch 100, and the control resistor 93 of the controller 90 may have different resistances.

Hereinafter, a method for diagnosing a failure in a piston cooling oil jet according to an exemplary embodiment of the present disclosure will be described in detail with reference to the accompanying drawings.

Figure 6:
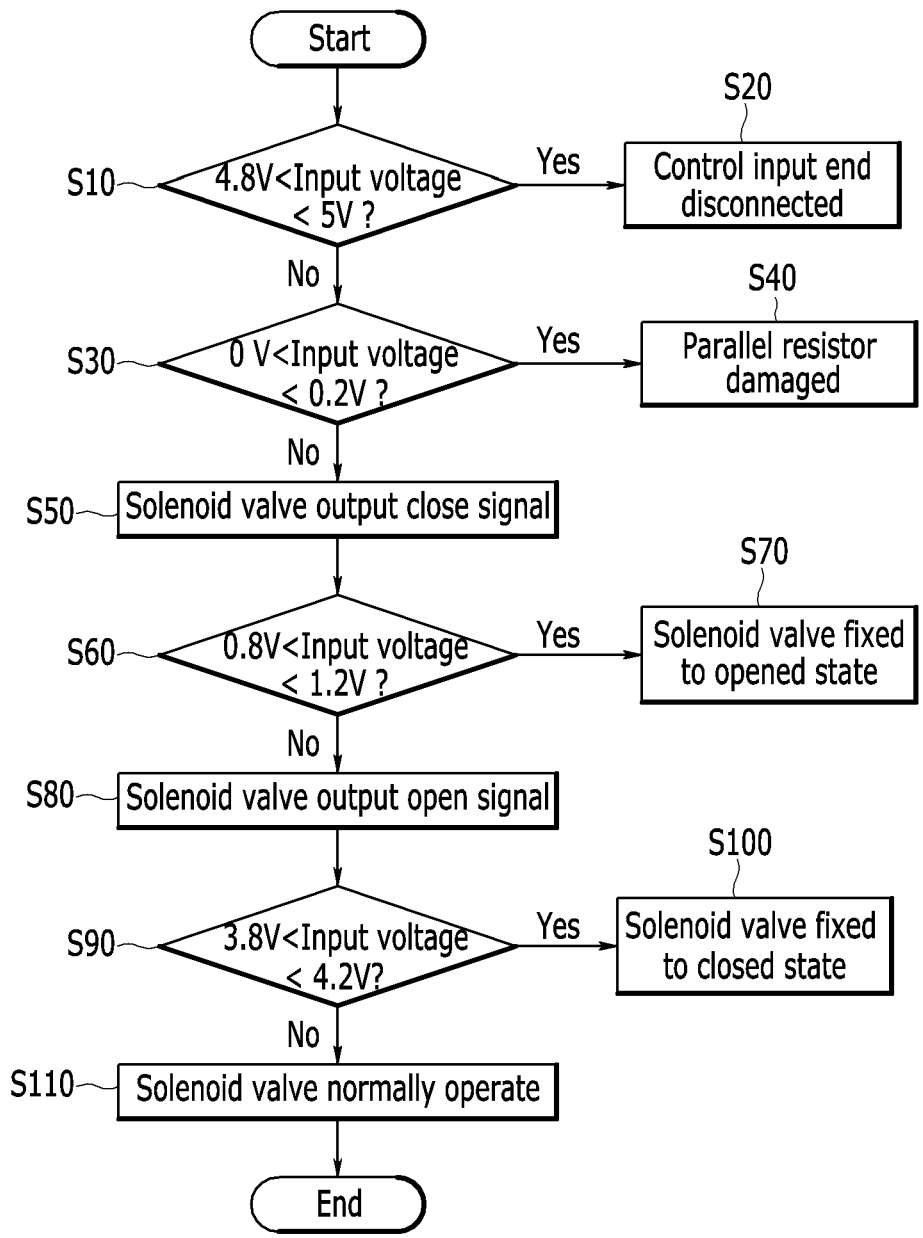
FIG. 6 is a flowchart of a method for diagnosing a failure in the piston cooling oil jet according to an exemplary embodiment of the present disclosure.

FIG. 6 is a flowchart of a method for diagnosing a failure in a piston cooling oil jet according to an exemplary embodiment of the present disclosure. In addition, FIG. 7 is a table of failure determination according to an input voltage of a control input terminal 95 according to an exemplary embodiment of the present disclosure.

For convenience of description, the control resistor 93 has resistance of 20 kilo-ohms, the first resistor 171 has resistance of 16/3 kilo-ohms, the second resistor 172 has resistance of 80 kilo-ohms, and a voltage output from the control power 91 is 5 V. In this case, the parallel resistors 170 may have resistance of 5 kilo-ohms.

Referring to FIG. 6 and FIG. 7, the controller 90 determines whether an input voltage of the control input terminal 95, input to the controller 90 from the output terminal of the oil pressure switch 100, is included within a predetermined range from a first predetermined voltage (S10).

The first predetermined voltage is an output voltage (e.g., 5 V) output from the control power 91, and the predetermined range has a range considering a deviation at 5 V.

That is, when the oil pressure switch 100 and the controller 90 are normally connected, a specific voltage needs to be output from the switch output terminal 190 depending on whether the moving plate 150 contacts the fixing plate 140, and then input to the control input terminal 95.

However, when the input power input to the control input terminal 95 is within a predetermined range (e.g., 5 V to 4.8 V) from the first predetermined voltage (i.e., 5 V), it may be determined that the controller 90 and the oil pressure switch 100 are not in a connected state or the control input terminal 95 is disconnected from the control power 91 (S20).

That is, when the control input terminal 95 is disconnected, the control resistor 93 is not affected, and thus a voltage (i.e., 5 V) output from the control power 91 is output from the control input terminal 95, which is connected with the control power 91.

The controller 90 determines whether an input voltage of the control input terminal 95, input to the controller 90 from the output terminal of the oil pressure switch 100, is included within a predetermined range from a second predetermined voltage (S30).

The second predetermined voltage is an output voltage (0 V) of the ground terminal, and the predetermined range (e.g., 0.2 V) is set considering a deviation at 0 V.

That is, when the oil pressure switch 100 and the controller 90 are normally connected, a specific voltage needs to be output and input to the control input terminal 95 depending on whether the moving plate 150 and the fixing plate 140 contact each other.

However, when the input power input to the control input terminal 95 is included with the predetermined range (e.g., 0 V to 0.2 V) from the second predetermined voltage of 0 V, the controller 90 determines that the parallel resistors 170 in the oil pressure switch 100 is damaged (S40).

That is, when one of the parallel resistors 170 in the oil pressure switch 100 is damaged, the control input terminal 95 is disconnected from the ground terminal such that the input voltage of the control input terminal 95 becomes 0 V.

The controller 90 outputs a close signal to close the solenoid valve 30 (S50), and determines whether the input voltage input to the controller 90 from the output terminal of the oil pressure switch 100 is included within a predetermined range from a third predetermined voltage (S60).

The third predetermined voltage implies a voltage (i.e., 5 V) that is output from the control power 91 and then applied to the second resistor 172 when the second resistor 172 and the control resistor 93 are connected in series, and the predetermined range is a voltage range (e.g., 0.2 V) set with consideration of a deviation.

That is, in a normal state, no engine oil flows to the oil path 12 when the solenoid valve 30 is closed, and thus the moving plate 150 and the fixing plate 140 of the oil pressure switch 100 contact each other, and the control resistor 93 is connected with a combined resistor of the first resistor 171 and the second resistor 172. Thus, the voltage (5 V) output from the control power 91 is divided into the control resistor 93 and the combined resistor according to a voltage distribution principle, and a voltage (i.e., 4 V±a) applied to the combined resistor becomes an input voltage of the control input terminal 95.

However, when the solenoid valve 30 is opened and maintains the opened state, the solenoid valve 30 still maintains the opened state even though a close signal is output from the controller 90 and engine oil flows to the oil path 12. Thus, since the moving plate 150 is separated from the fixing plate 140 by a pressure of the engine oil flowing through the oil path 12, the first resistor 171 is opened and the control resistor 93 and only the second resistor 172 are connected in series. In addition, the voltage (i.e., 5 V) output from the control power 91 is divided into the control resistor 93 and the second resistor 172, and the voltage (1 V±0.2 V) applied to the second resistor 172 becomes an input voltage of the control input terminal 95.

Thus, in such a case, the controller 90 may determine that the solenoid valve 30 in an opened-state is fixed to the opened state (S70).

The controller 90 outputs an open signal to open the solenoid valve 30 (S80), and the controller 90 determines whether the input voltage of the control input terminal 95, which is output from the output terminal of the oil pressure switch 100, is included within a predetermined range from a fourth predetermined voltage (S90).

The fourth predetermined voltage implies a voltage (i.e., 5 V) that is output from the control power 91 and then input to the control input terminal 95 (i.e., the combined resistor of the first resistor 171 and the second resistor 172 in parallel) when the control resistor 93 and one of the parallel resistors 170 are connected in series, and the predetermined range is a voltage range (e.g., ±0.2 V) that is set considering a deviation.

That is, in a normal state, engine oil flows to the oil path 12 when the solenoid valve 30 is opened, and thus the moving plate 150 and the fixing plate 140 of the oil pressure switch 100 are separated from each other, and the control resistor 93 is connected with second resistor 172 in series. Thus, the voltage (5 V) output from the control power 91 is divided into the control resistor 93 and the second resistor 172 according to the voltage distribution principle, and a voltage (1 V±a) applied to the second resistor 172 becomes an input voltage of the control input terminal 95.

However, when the solenoid valve 30 is closed and fixed to the closed state, the solenoid valve 30 maintains the closed stated even though an open signal is output from the controller 90, and no engine oil flows to the oil path 12. Thus, the moving plate 150 and the fixing plate 140 contact each other, and accordingly, the first resistor 171 and the second resistor 172 function as the parallel resistors 170, and the control resistor 93 is connected with the combined resistor of the parallel resistors 170 in series. In addition, the voltage (5 V) output from the control power 91 is divided into the control resistor 93 and the combined resistor, and a voltage (4 V±0.2 V) applied to the combined resistor becomes an input voltage of the control input terminal 95.

Accordingly, in such a case, the controller 90 may determine that the solenoid valve 30 in the closed state is fixed to the closed state (S100).

As described above, according to the exemplary embodiment of the present disclosure, whether the solenoid valve 30 and the oil pressure switch 100 malfunction or not can be determined without using an additional oil pressure sensor.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for diagnosing a failure in a piston oil cooling jet having an oil path through which oil flows for cooling a piston, the apparatus comprising:
   a solenoid valve selectively opening and closing the oil path;
   an oil pressure switch connected in the oil path, outputting an output signal through a switch output terminal according to a pressure of oil that flows through the oil path, and to which a parallel resistor is electrically connected to a front end of the switch output terminal; and a controller having a control resistor of which a first end is electrically connected with a control power and a second end is electrically connected with the switch output terminal of the oil pressure switch through a connector, wherein the controller controls opening and closing of the solenoid valve and determines whether the solenoid valve and the oil pressure switch malfunction based on an input voltage of a control input terminal of the controller.

2. The apparatus of claim 1, wherein, when the input voltage of the control input terminal is within a predetermined range from a first voltage, the controller determines that the controller and the oil pressure switch are not electrically connected.

3. The apparatus of claim 2, wherein the first voltage is set as an output voltage of the control power.

4. The apparatus of claim 1, wherein, when the input voltage of the control input terminal is within a predetermined range from a second voltage, the controller determines that the parallel resistor in the oil pressure switch is damaged and malfunctions.

5. The apparatus of claim 4, wherein the second voltage is set as an output voltage of a ground terminal.

6. The apparatus of claim 1, wherein when a close signal, which controls the solenoid valve to be closed, is outputted from the controller and the input voltage of the control input terminal is within a predetermined range from a third voltage, the controller determines that the solenoid valve is opened and then fixed to the opened state.

7. The apparatus of claim 6, wherein the parallel resistor include a first resistor and a second resistor, and wherein the third voltage is set as a voltage outputted from the control power and then applied to one of the first resistor and the second resistor when the one of the first resistor and the second resistor and the control resistor are connected in series.

8. The apparatus of claim 1, wherein, when an open signal, which controls the solenoid valve to be opened, is outputted from the controller and the input voltage of the control input terminal is within a fourth voltage, the controller determines that the solenoid valve is closed and then maintains to be in a closed state.

9. The apparatus of claim 8, wherein the parallel resistor include a first resistor and a second resistor, and wherein the fourth voltage is set as a voltage outputted from the control power and applied to a combined resistor of the first resistor and the second resistor when the parallel resistor and the combined resistor are connected to the control resistor in series.

10. The apparatus of claim 1, wherein t the parallel resistor and the control resistor have different resistances.

11. A method for diagnosing a failure in a piston cooling jet, which includes: a solenoid valve selectively opening and closing an oil path; an oil pressure switch outputting an output signal through a switch output terminal according to opening and closing of the solenoid valve and outputting an output signal through a switch output terminal that is electrically connected with parallel resistors; and a controller that includes a control resistor of which a first end is electrically connected with a control power and a second end is electrically connected with the switch output terminal of the oil pressure switch through a connector, the method comprising steps of:

determining, by a controller, whether an input voltage of a control input terminal of the controller is within a predetermined range from a first voltage;

determining, by the controller, whether the input voltage of the control input terminal is within a predetermined range from a second voltage;

determining, by the controller, whether the input voltage of the control input terminal is within a predetermined range from a third voltage when a close signal is output to close the solenoid valve;

determining, by the controller, whether the input voltage of the control input terminal is within in a predetermined range from a fourth voltage by the controller when an open signal that controls the solenoid valve to be opened is output; and determining, by the controller, whether the solenoid valve and the oil pressure switch malfunction from the input voltage of the control input terminal.

12. The method of claim 11, wherein when the input voltage of the control input terminal is within in the predetermined range from the first voltage, the controller determines that the controller and the oil pressure switch are disconnected.

13. The method of claim 12, wherein the first voltage is set as an output voltage of the control power.

14. The method of claim 11, wherein, when the input voltage of the control input terminal is within in the predetermined range from the second voltage, the controller determines that the parallel resistors in the oil pressure switch are damaged.

15. The method of claim 14, wherein the second voltage is set as an output voltage of a ground terminal.

16. The method of claim 11, wherein, when the input voltage of the control input terminal is within in the predetermined range from the third voltage, the controller determines that the solenoid valve is opened and then fixed to the opened state.

17. The method of claim 16, wherein, when one of the parallel resistors and the control resistor are connected in series, the third voltage is set as a voltage that is output from the control power and then applied to the one of the parallel resistors.

18. The method of claim 11, wherein, when the input voltage of the control input terminal is within in the predetermined range from the fourth voltage, the controller determines that the solenoid valve is closed and then maintains to be in a closed state.

19. The method of claim 18, wherein, when the parallel resistors and the control resistor are connected in series, the fourth voltage is set to a voltage output from the control power and then is applied to a combined resistor.

* * * * *